United States Patent
Jachim et al.

(10) Patent No.: US 11,705,711 B2
(45) Date of Patent: Jul. 18, 2023

(54) SUPPORT CORE FOR AN ELASTIC SLEEVE

(71) Applicant: 3M INNOVATIVE PROPERTIES COMPANY, St. Paul, MN (US)

(72) Inventors: Anton F. Jachim, St. Paul, MN (US); Sally M. Grambusch, Round Rock, TX (US); Robert M. Anderton, Cedar Park, TX (US); Mark A. Hoisington, Austin, TX (US); Jeffrey M. Maki, Inver Grove Heights, MN (US); Christopher J. Evoniuk, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1 day.

(21) Appl. No.: 17/593,003

(22) PCT Filed: Mar. 10, 2020

(86) PCT No.: PCT/IB2020/052054
§ 371 (c)(1),
(2) Date: Sep. 3, 2021

(87) PCT Pub. No.: WO2020/208440
PCT Pub. Date: Oct. 15, 2020

(65) Prior Publication Data
US 2022/0181863 A1    Jun. 9, 2022

Related U.S. Application Data

(60) Provisional application No. 62/893,886, filed on Aug. 30, 2019, provisional application No. 62/831,422, filed on Apr. 9, 2019.

(51) Int. Cl.
*H02G 15/00*    (2006.01)
*H02G 15/18*    (2006.01)
*B29C 63/18*    (2006.01)

(52) U.S. Cl.
CPC ......... *H02G 15/1826* (2013.01); *B29C 63/18* (2013.01)

(58) Field of Classification Search
CPC ............................ H02G 15/1826; B29C 63/18
See application file for complete search history.

(56) References Cited

U.S. PATENT DOCUMENTS

| 3,515,798 A | 6/1970 | Sievert |
| 4,168,393 A * | 9/1979 | Silva .................... H02G 15/103 264/156 |

(Continued)

FOREIGN PATENT DOCUMENTS

| DE | 29812977 | 12/1998 |
| EP | 2328248 | 6/2011 |
| WO | WO 2007-130811 | 11/2007 |

OTHER PUBLICATIONS

International Search Report for PCT International Application No. PCT/IB2020/052054, dated May 13, 2020, 5 pages.

*Primary Examiner* — Pete T Lee
(74) *Attorney, Agent, or Firm* — Gregg H. Rosenblatt

(57) ABSTRACT

A support core for an elastic sleeve comprises a first cylindrical section disengagably connected to a second cylindrical section. Each cylindrical section has an annular sidewall made up of a plurality of interlocking concave plates extending longitudinally along a portion of the support core between a abutment end and a distal end. The abutment end of each cylinder section includes a generally helical edge. The plurality of concave plates comprises a top and bottom surfaces, having two opposing longitudinal edges extending between said surfaces on opposite sides of the concave plate. Each of the longitudinal edges comprises an interlocking feature that configure to connect to a mating feature of at least one other concave plate to form one of cylindrical sections of the support core.

16 Claims, 13 Drawing Sheets

(56) References Cited

U.S. PATENT DOCUMENTS

| | | | |
|---|---|---|---|
| 5,070,597 A * | 12/1991 | Holt | F16L 5/02 |
| | | | 285/97 |
| 5,577,310 A | 11/1996 | Cheenne-Astorino | |
| 5,746,253 A | 5/1998 | Dust | |
| 5,801,332 A | 9/1998 | Berger | |
| 5,925,427 A | 7/1999 | Sadlo | |
| 5,970,596 A | 10/1999 | Cardinaels | |
| 6,103,975 A | 8/2000 | Krabs | |
| 6,472,600 B1 * | 10/2002 | Osmani | H02G 1/14 |
| | | | 174/75 R |
| 7,261,155 B1 * | 8/2007 | Ward | E21B 17/025 |
| | | | 166/380 |
| 7,767,909 B2 | 8/2010 | Krabs | |
| 7,838,770 B2 | 11/2010 | Portas | |
| 8,119,193 B2 | 2/2012 | Vallauri | |
| 8,709,557 B2 | 4/2014 | Rivard | |
| 2004/0016564 A1 | 1/2004 | Lambert, Jr. | |
| 2007/0029792 A1 | 2/2007 | Andre | |
| 2011/0254197 A1 | 10/2011 | Verner | |
| 2014/0166340 A1 * | 6/2014 | McLaughlin | H02G 15/1826 |
| | | | 29/728 |
| 2016/0089846 A1 * | 3/2016 | McCartney | B32B 27/306 |
| | | | 264/150 |
| 2019/0025516 A1 * | 1/2019 | Lichoulas | G02B 6/4403 |
| 2020/0282691 A1 | 9/2020 | Biegler | |

\* cited by examiner

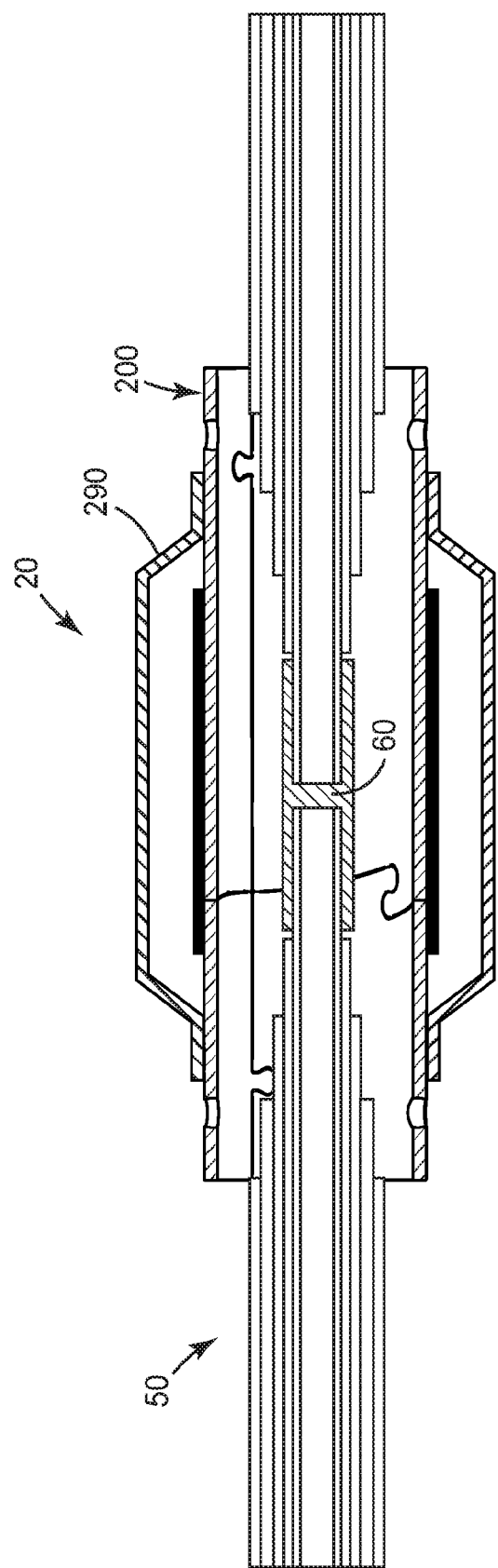

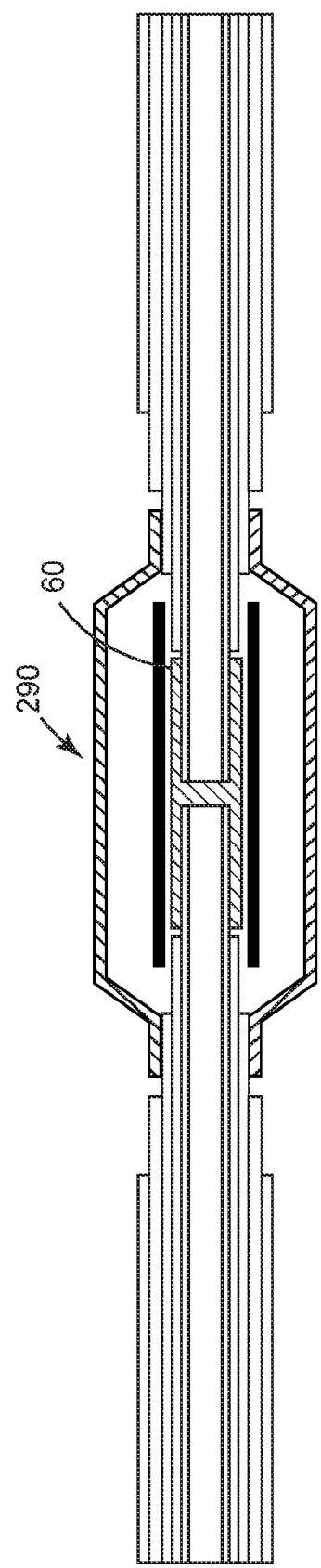

SUPPORT CORE FOR AN ELASTIC SLEEVE

BACKGROUND OF THE INVENTION

Field of the Invention

This invention is related to a new support and delivery core system for cold shrink cable accessories. Specifically, the new support core comprises first and second cylinder sections comprising a plurality of interlocking plates.

Background

Elastic sleeves are known in the art and are particularly useful in the electrical distribution industry. The elastic sleeves are provided in an expanded state and shrunk onto cables or cable junctions to provide electrical insulation by the application of heat or provided with a support structure to hold the sleeve in an expanded state. In this latter case, the elastic sleeve is free to contract or shrink when the support structure is removed. The assembly of an expanded elastic sleeve with a support structure is generally referred to as a cold shrink accessory.

A common type of cold shrink cable accessory comprises a highly stretched elastic sleeve placed on an internal support core which can be delivered to a customer for installation on electrical power cables (or other types of cable systems). The customer will then remove the support core as part of the installation process of the cable accessory. It is important that the support cores used in these cable accessories provide adequate support for the highly stretched elastic cable accessories before use (typically up to 3 years), enable accurate placement of the cable accessory on the cable, and be easy to remove by the customer during installation.

One conventional support core is made by winding and ultrasonic welding of a polymeric ribbon into a tubular shape to create support cores of desired lengths and diameter for cable accessory applications. However, some customers have indicated a preference for a solid polymer support core construction compared to a wound ribbon construction during the installation process of the cable accessory.

Conventional, solid polymer support cores for cable accessories have limitations affecting their wide spread acceptance. Solid cores can impact the accuracy of the cable accessory installation due to installation forces required to remove large core sections at one time. Additionally, each solid core construction is only good for one size of accessory and can therefore require several sizes and lengths to enable delivery of the many sizes of cable accessories which can result in additional cost in manufacturing and planning. Thus, there is a need for elastic sleeves on solid cores that are more economical and easier to install than conventional solid support cores.

SUMMARY OF THE INVENTION

In a first embodiment, a support core is described that is configured to maintain an elastic sleeve in an expanded state. The support core comprises a first cylindrical section disengagably connected to a second cylindrical section, wherein each cylindrical section of the first and second cylindrical sections comprises an annular sidewall made up of a plurality of interlocking concave plates extending longitudinally along a portion of the support core between an abutment end and a distal end. The abutment end of each cylinder section includes a generally helical edge that causes the first and second cylinder sections to longitudinally separate when the first cylinder section is rotationally displaced with respect to the second cylinder section. Each of the plurality of to interlocking concave plates comprises a bottom surface, a top surface that is substantially parallel to the bottom surface and two opposing longitudinal edges extending between the top and bottom surfaces on opposite sides of the concave plate, wherein each of the two opposing longitudinal edges comprises an interlocking feature configured to connect to a mating feature of at least one other concave plate to form one of the first and second cylindrical section of the support core.

In a second embodiment, a cable accessory is described that comprises an elastic sleeve disposed on a support core to maintain an elastic sleeve in an expanded state. The support core comprises a first cylindrical section disengagably connected to a second cylindrical section, wherein each cylindrical section of the first and second cylindrical sections comprises an annular sidewall made up of a plurality of interlocking concave plates extending longitudinally along a portion of the support core between a abutment end and a distal end. The abutment end of each cylinder section includes a generally helical edge causes the first and second cylinder sections to longitudinally separate when the first cylinder section is rotationally displaced with respect to the second cylinder section. Each of the plurality of interlocking concave plates comprises a bottom surface, a top surface that is substantially parallel to the bottom surface and two opposing longitudinal edges extending between the top and bottom surfaces on opposite sides of the concave plate, wherein each of the two opposing longitudinal edges comprises an interlocking feature configured to connect to a mating feature of at least one other concave plate to form one of the first and second cylindrical section of the support core.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 7A and 7B are schematic diagram showing installation of a molded multilayer elastic sleeve onto a cable splice according to an aspect of the current invention.

Figure 1A:
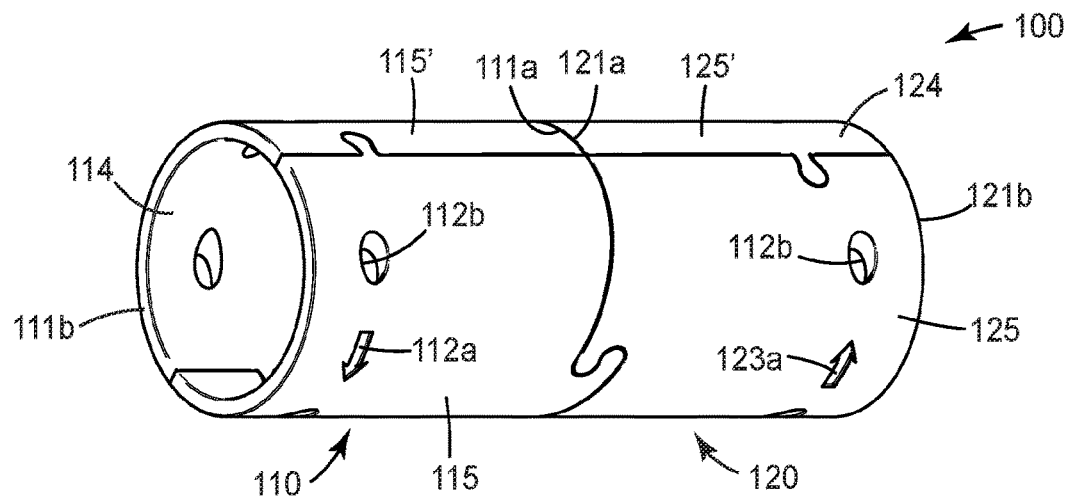
FIGS. 1A-1C are three views of an exemplary support core according to the present invention.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized, and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The exemplary new solid polymer support core design described herein is easy to manufacture, enables accurate placement of the cable accessory during the installation process and provides for easy customer removal.

Figure 1B:
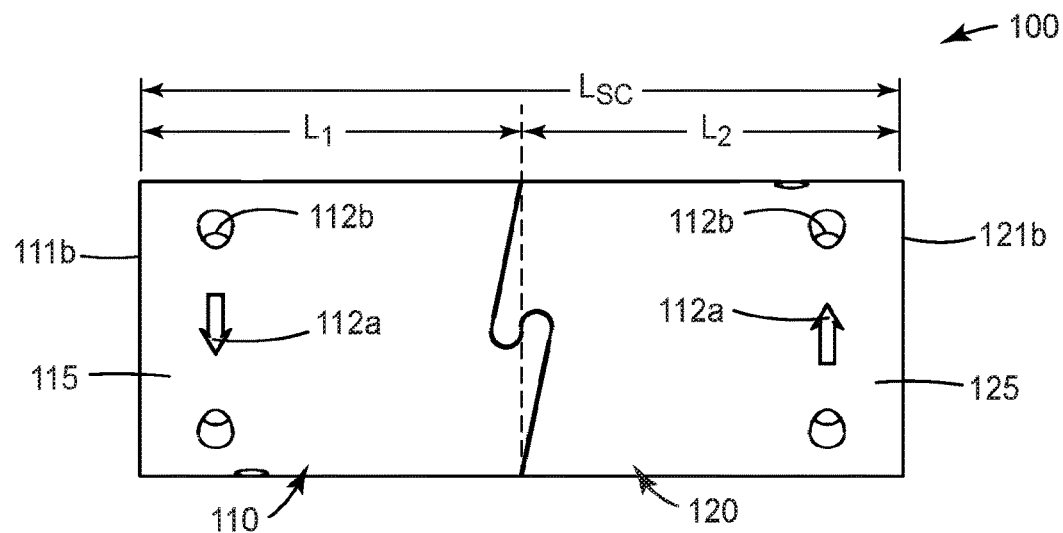
Figure 1C:
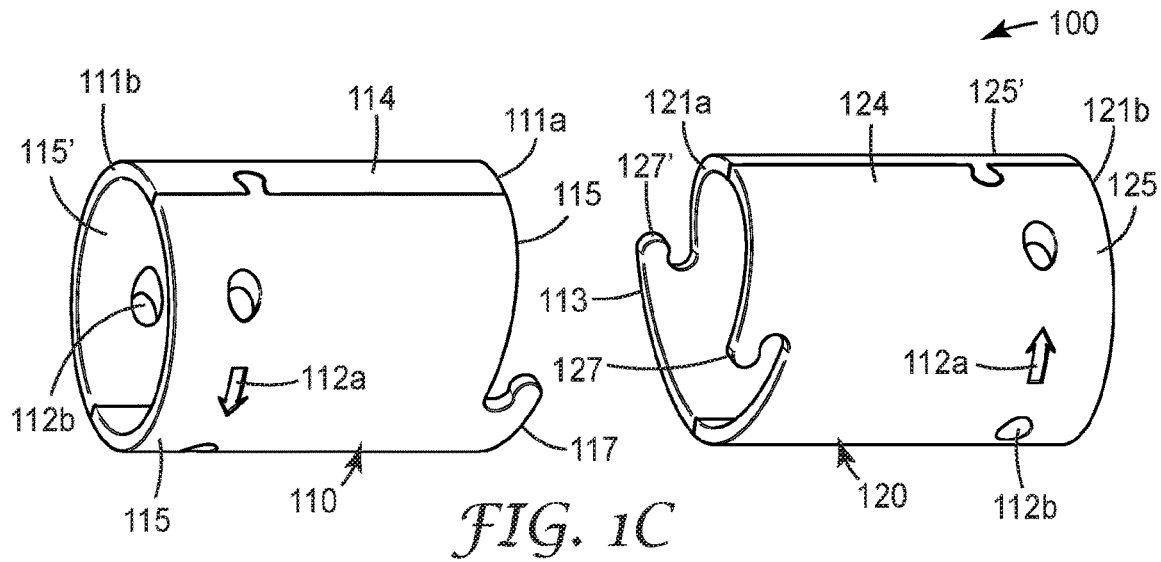

FIGS. 1A-1C are three views of an exemplary support core 100 that comprises a first cylindrical section 110 disengagably connected to a second cylindrical section 120. Each cylindrical section 110, 120 has an annular sidewall 114, 124 made up of a plurality of interlocking plates 115, 115', 125, 125' extending longitudinally along a portion of the support core between an abutment end 111a, 121a and a distal end 111b, 121b. The abutment end of each cylinder section includes a generally helical edge (best illustrated in FIG. 1C as helical edge 113). The helical edges on adjoining first and second cylinder sections 110, 120 causes the cylindrical sections to longitudinally separate when the first cylinder section is rotationally displaced with respect to the second cylinder section as will be described in additional detail below.

The first and second cylinder sections 110, 120 of support core 100 can be characterized by an inner diameter, a wall thickness and their longitudinal length $L_1$ and $L_2$, respectively. The diameter of the support core and therefore, the first and second cylinder sections should be large enough to freely slide over an electrical cable, cable accessory or termination lug to be insulated by the elastic sleeve, such as sleeve 190 in FIGS. 3A and 3B carried on the external surface 109 of the support core. The length of the support core, $L_{SC}$, is equal to the combined length of the first and second cylinder sections (i.e. $L_{SC}=L_1+L_2$) and in one aspect, the length of the support core should be greater than length of the elastic sleeve. In another aspect, the elastic sleeve can be longer than the length of the support core, but the excess length of the sleeve will be folded back over the portion of the elastic disposed on the support core revealing the distal ends of the support core in order to facilitate removal of the support core during installation of the elastic sleeve onto and electrical cable.

Figure 2A:
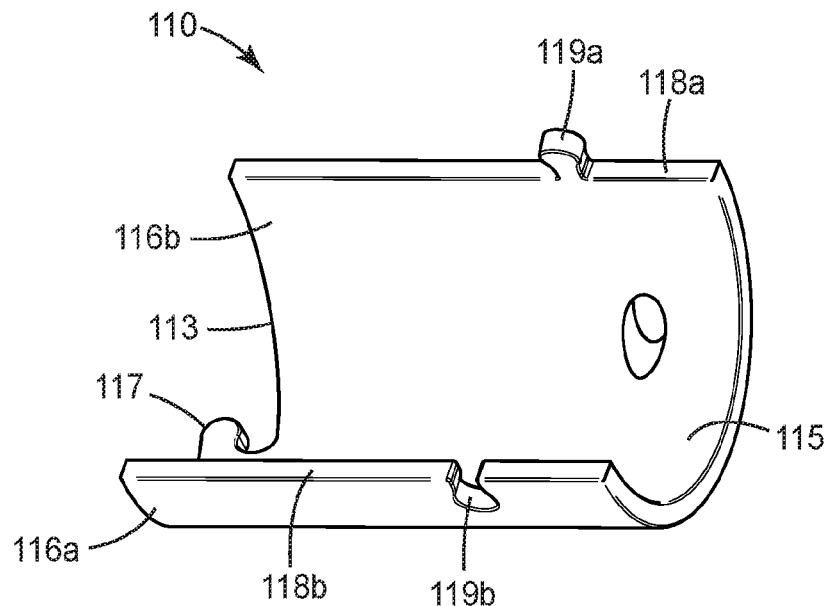
FIGS. 2A-2C are three views of an exemplary interlocking plate used to form the support core of FIGS. 1A and 1B.
Figure 2B:
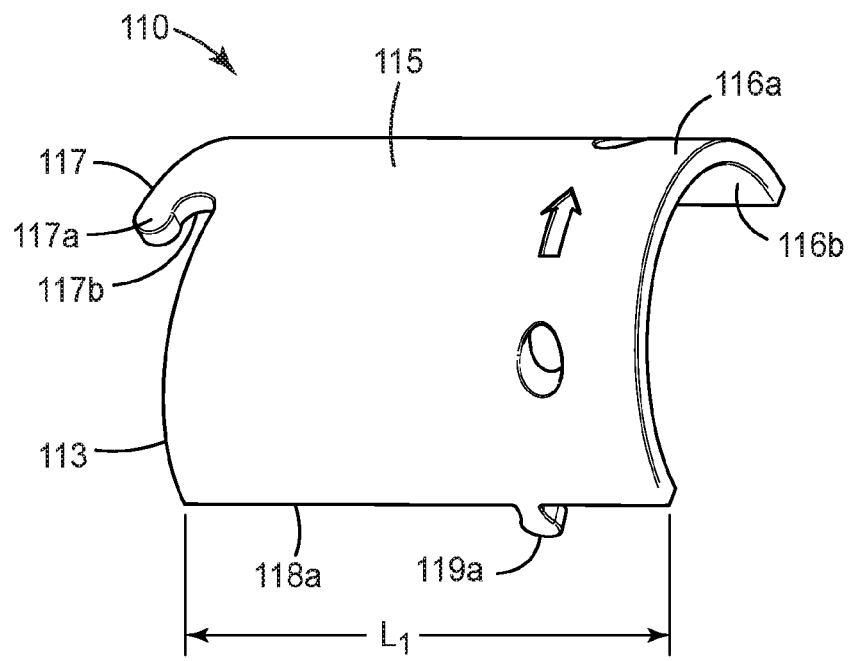

Each cylinder section 110, 120 can further include interlocking features 117, 127, 127' extending from the helical edge 113 on opposite sides of each of the first and second cylindrical sections to secure the first and second cylindrical sections together in an end to end arrangement until the interlocking features are disengaged. Referring to FIGS. 2A and 2B, each interlocking feature 117 can be disposed along the helical edge 113 of each interlocking plate (such as interlocking plate 115 in FIGS. 2A and 2B). Each interlocking feature comprises a tab portion 117a and a receptacle portion 117b configured to receive the tab portion of the mating cylinder section when the first and second cylindrical sections are assembled to form support core 100.

Figure 2C:
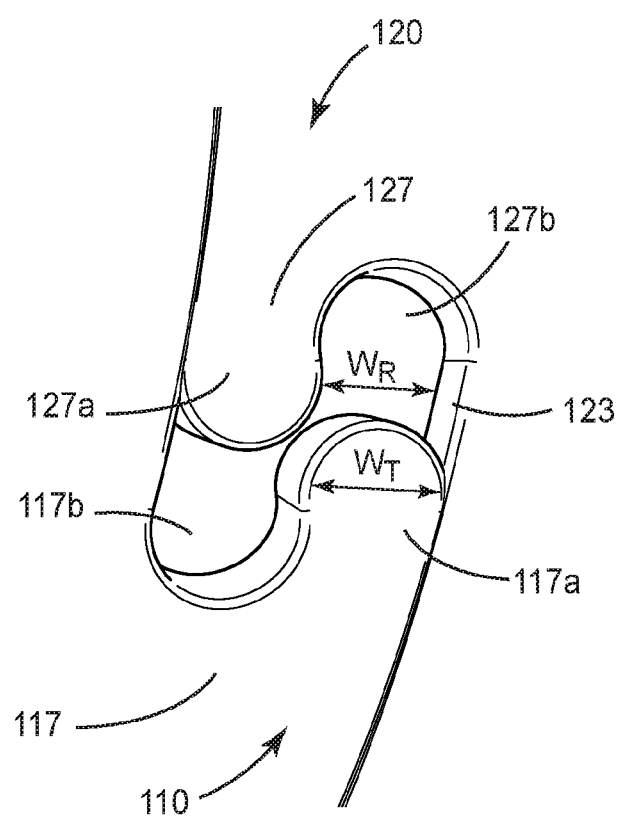

In an exemplary aspect illustrated in the detail view of FIG. 2C, tab portion 117a is characterized by a maximum width, $W_T$, that is larger than the minimum width, $W_R$ of the receptacle portion 127b in which the tab portion resides when the first and second cylindrical sections 110, 120, respectively, are assembled to form support core. The maximum width of the tab portions and the minimum width of the receptacle portions of interlocking features 117, 127 can be varied to set the torque required to initiate separation of the first and second cylindrical sections.

Referring to FIGS. 2A and 2B, each of the plurality of interlocking plates, such as interlocking plate 115, have a concave shape so that when they are joined together they form a cylindrical section. Interlocking plate 115 comprises a bottom surface 116a, a top surface 116b that is substantially parallel to the bottom surface and two opposing longitudinal edges 118a, 118b extending between the top and bottom surfaces on opposite sides of the interlocking plate. Each of the two opposing longitudinal edges comprises a joining feature configured to connect to a mating feature of at least one other concave plate to form one of the first or second cylindrical sections of the support core. For example, a locking tongue 119a extends from longitudinal edges 118 and longitudinal edge 118b has a pocket 119b formed therein that is configured to receive tongue 119a in an interference fit. While the locking tongue and pocket shown in the figures has a generally rounded shape, one of ordinary skill in the art will recognize that these joining features may have other shapes such as a T-shape, a dove tail shape or other close fitting joining shape.

In the exemplary embodiments described herein, interlocking plates 115, 125 have a concave shape which can be made by a conventional injection molding process. The exemplary interlocking plates can be made from a thermo plastic polymer such as high density polyethylene, polypropylene, high impact polystyrene, polyvinylchloride, and acrylonitrile butadiene styrene (ABS) resin. In some embodiments, interlocking plates can be molded such that when the interlocking plates are assembled into a cylinder section the resulting cylinder section has a slight flare. The flare may allow the elastic sleeve to aid and pushing the cylinder section out of the elastic sleeve during installation.

In an exemplary aspect, the plurality of interlocking plates for a given cylindrical section (i.e. either the first or second cylinder sections) can be identical. In some embodiments all of the interlocking plates for both the first and second cylinder sections can be identical as illustrated in FIGS. 1A-1C. Having some or all of the interlocking plates identical can reduce the number of molds required, simplifying and reducing the manufacturing cost of the support cores described herein.

Figure 4:
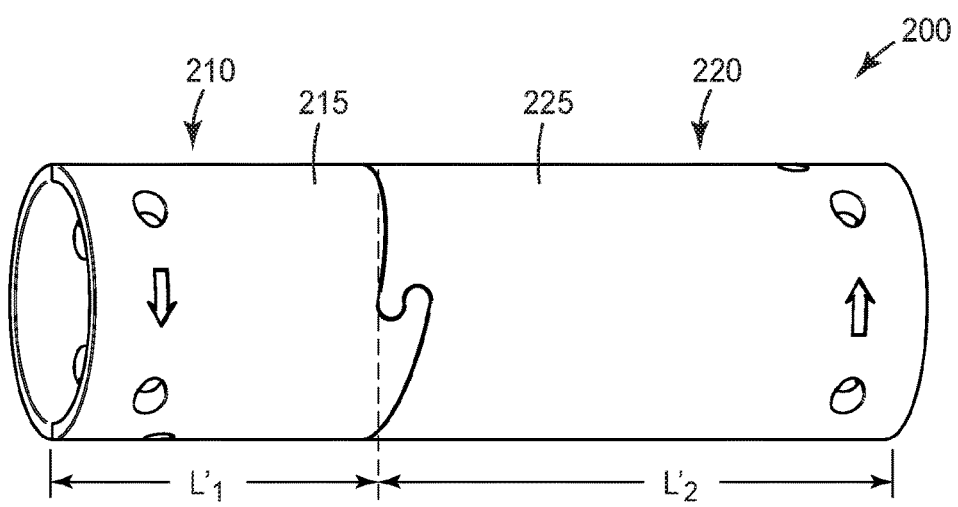
FIG. 4 shows and alternative exemplary support core according to the present invention.

On the other hand, all of the interlocking plates 215 for the first cylinder section 210 can be identical, but different from the identical interlocking plates 225 of the second cylinder section 220 of support core 200, as shown in FIG. 4. In particular, interlocking plates 225 are longer than interlocking plates 215 such that $L_2'>L_1'$.

In an alternative aspect, one of ordinary skill in the art will recognize that an interlocking plate with two tongues extending from opposing longitudinal edges can be mated with an interlocking plate having two pockets formed in its opposing longitudinal edges and is considered within the scope of the current invention. Also, while the exemplary embodiments described herein disclose that each cylinder section is formed of two interlocking plates, cylinder sections having more than two interlocking plates are contemplated for large diameter cables and/or cable accessories.

Figure 8:
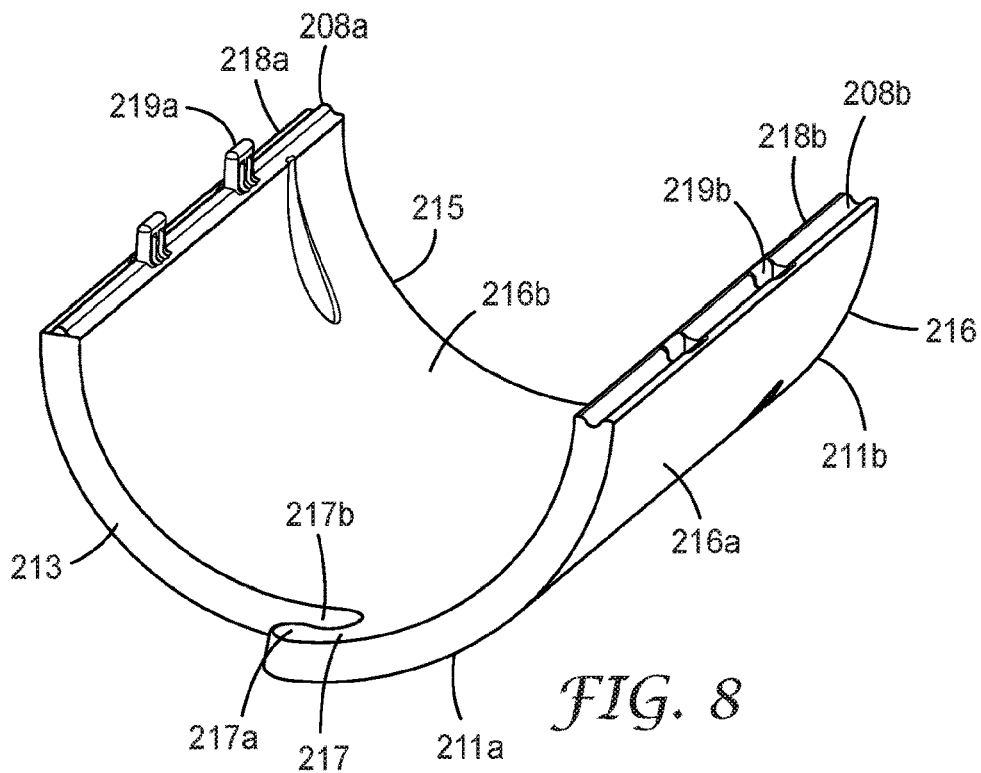
FIG. 8 is an isometric view of an alternative exemplary interlocking plate according to the present invention.
Figure 9A:
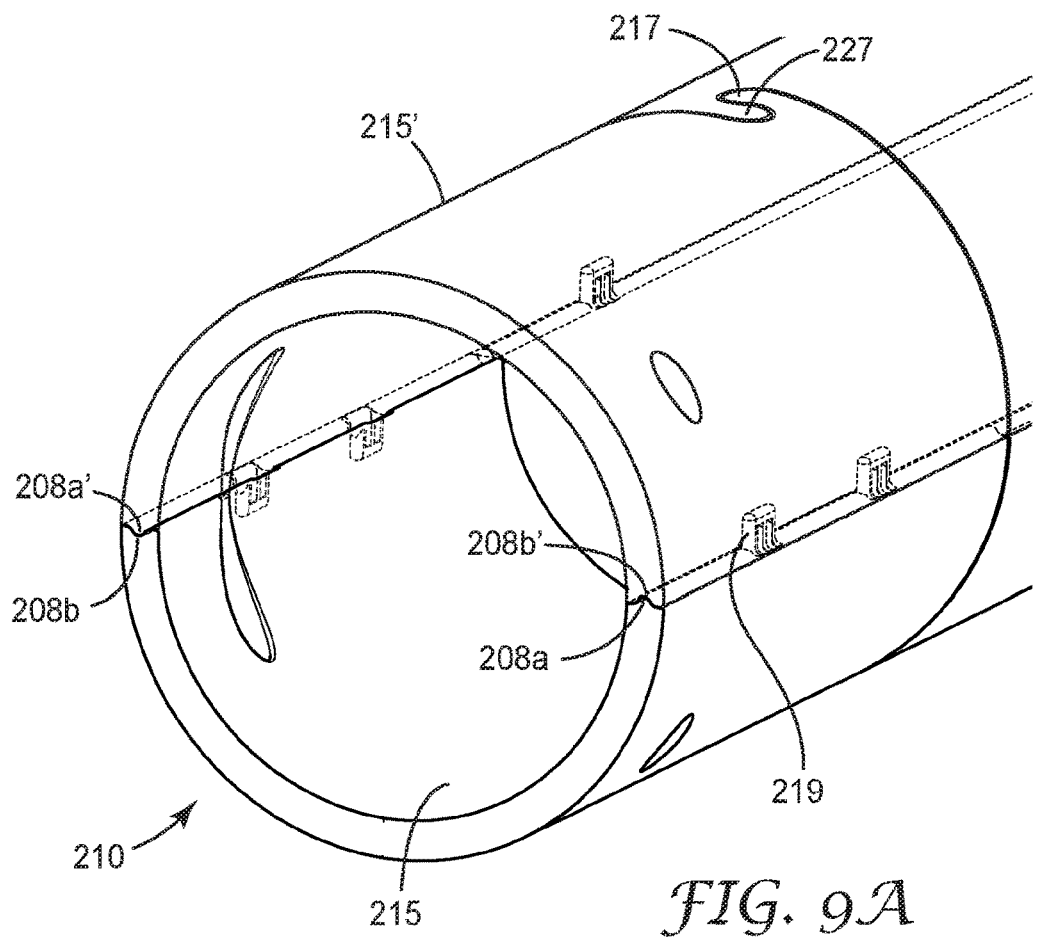
FIGS. 9A-9C are three views of an exemplary support core comprising the alternative exemplary interlocking plate FIG. 8.
Figure 9B:
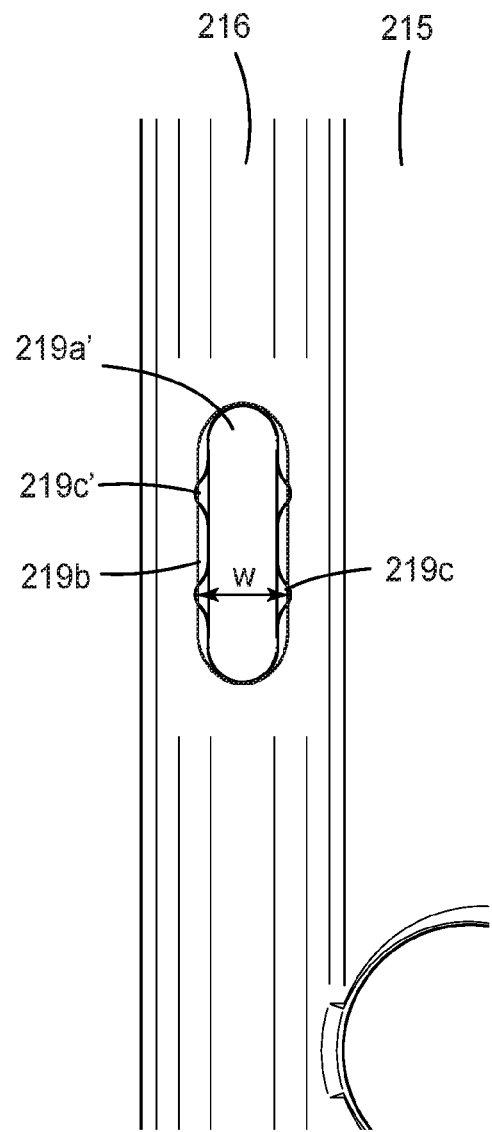
Figure 9C:
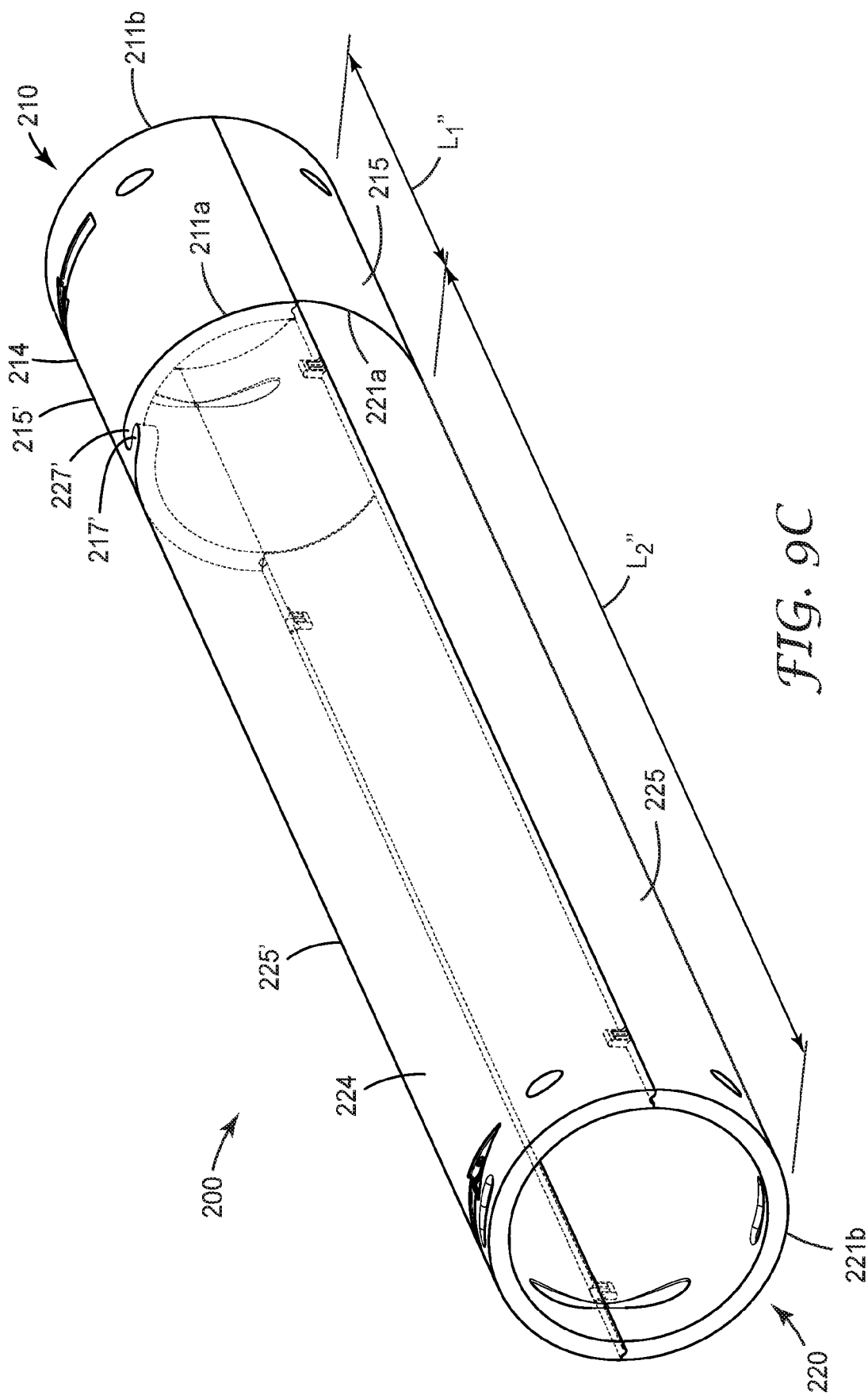

FIG. 8 shows an alternative exemplary interlocking plate 210 of an exemplary support core 200 shown in FIG. 9C. Support core 200 comprises a first cylindrical section 210 disengagably connected to a second cylindrical section 220. Each cylindrical section 210, 220 has an annular sidewall 214, 224 made up of a plurality of interlocking plates 215, 215', 225, 225', respectively, as described previously, extending longitudinally along a portion of the support core between an abutment end 211a, 221a and a distal end 211b, 221b. The abutment end 211a, 221a of each cylinder section includes a generally helical edge (best illustrated in FIG. 1C as helical edge 113). The helical edges on adjoining first and second cylinder sections 210, 220 causes the cylindrical sections to longitudinally separate when the first cylinder section is rotationally displaced with respect to the second cylinder section as will be described in additional detail below.

The first and second cylinder sections 210, 220 of support core 200 can be characterized by an inner diameter, a wall thickness and their longitudinal length $L_1''$ and $L_2''$, respectively. The diameter of the support core and therefore, the first and second cylinder sections should be large enough to freely slide over an electrical cable, cable accessory or termination lug to be insulated by the elastic sleeve, such as sleeve 190 in FIGS. 3A and 3B carried on the external surface 109 of the support core. The length of the support core, $L_{SC}$, is equal to the combined length of the first and second cylinder sections (i.e. $L_1''+L_2''$) and in one aspect, the length of the support core should be greater than length of the elastic sleeve. In another aspect, the elastic sleeve can be longer than the length of the support core, but the excess length of the sleeve will be folded back over the portion of the elastic disposed on the support core revealing the distal ends of the support core.

Each cylinder section 210, 220 can further include interlocking features 217, 217', 227, 227' (note interlocking features 217 and 227 are shown in FIG. 9A, and interlocking features 217' and 227' are shown in FIG. 9C). The interlocking features extend from the helical edge 213 on opposite sides of each of the first and second cylindrical sections to secure the first and second cylindrical sections together in an end to end arrangement until the interlocking features are disengaged.

Each interlocking feature (for example interlocking feature 217 shown in FIG. 8) is disposed along the helical edge 213 of each interlocking plate (such as interlocking plate 215). Each interlocking feature comprises a tab portion 217a and a receptacle portion 217b configured to receive the tab portion of the mating cylinder section when the first and second cylindrical sections are assembled to form the support core, as described previously with respect to interlocking feature 117 shown in FIGS. 2A and 2B.

Referring again to FIG. 8, each of the plurality of interlocking plates, such as interlocking plate 215, have a concave shape so that they can be joined together to form a cylindrical section. Interlocking plate 215 comprises a bottom surface 216a, a top surface 216b defining sidewall 216. Sidewall 216 has two opposing longitudinal edges 218a, 218b extending between the top and bottom surfaces on opposite sides of the interlocking plate. Each of the two opposing longitudinal edges comprises a joining feature (collectively 219) configured to connect to a mating feature of at least one other interlocking plate to form one of the first or second cylindrical sections of the support core. For example, a locking tongue 219a extends from longitudinal edges 218a and longitudinal edge 218b has a receiving pocket 219b or more simply pocket 219b formed in sidewall 216 that is configured to receive tongue 219a in an interference fit. The locking tongues may include one or more protrusions 219c disposed on the sides of the locking tongues to control the tightness of the fit between the locking tongues and the receiving pockets and hence the force required to separate two joined interlocking plates.

For example, FIG. 9B is a cross section through a sidewall 216 of two joined interlocking plates across one set of joining features 219a' 219b. As can be seen in the figure, locking tongue 219a of the mating interlocking plate (not shown) has two sets of protrusions 219c disposed on each side of locking tongue 219a'. The total width, w, of the locking tongues between the apices of opposing protrusions is greater than or equal to the width of the receiving pocket formed in the sidewall of interlocking plate 215. While the strength or tightness of the interference fit depends in part on material used to form the interlocking plates, increasing the width of the locking tongues will increase the strength of the interference fit.

While the cross sections of locking tongue 219a and receiving pocket 219b is a generally oval shape, one of ordinary skill in the art will recognize that these joining features may have other shapes such as a rectangular shape, elliptical shape, circular shape, or other close fitting joining shape having either generally vertical or tapered configuration from base to peak/recess of the joining feature. In some embodiments, the joining feature can be slightly enlarged near the peak or recess of the joining features to increase the initial force required to separate joined interlocking plates.

In some embodiments, the interlocking plates can include alignment features to help maintain proper positioning of the interlocking plates when they are joined to form a cylinder section. For example, the alignment features can take the form of an alignment rib 208a disposed along longitudinal edge 218a and an alignment channel 208b molded into longitudinal edge 218b of interlocking plate 215 as shown in FIG. 8. FIG. 9A shows assembled cylinder section 210 showing how alignment rib 208a fits into alignment channel 208b' and alignment rib 208a' fits into alignment channel 208b when interlocking plates 215, 215' are joined together.

In an exemplary aspect, the plurality of interlocking plates for a given cylindrical section (i.e. either the first or second cylinder sections) can be identical. In some embodiments all of the interlocking plates for both the first and second cylinder sections can be identical as illustrated in FIGS. 1A-1C. Having some or all of the interlocking plates identical can reduce the number of molds required, simplifying and reducing the manufacturing cost of the support cores described herein.

On the other hand, all of the interlocking plates 215 for the first cylinder section 210 can be identical, but different from the identical interlocking plates 225 of the second cylinder section 220 of support core 200, as shown in FIG. 9C. In particular, interlocking plates 225 are longer than interlocking plates 215 such that $L_2" > L_1"$.

In some embodiments a grease (not shown) may be placed between the elastic sleeve and the support core. The grease is applied either before or during the placement of the cable accessory over the support core system. The grease can be a silicone grease or other suitable grease system. The grease can aid in installing the elastic sleeve on said support core as well as facilitating removal of the cylinder sections of the support core from the elastic sleeve during installation. In some respects, the grease may also aid in sealing the elastic sleeve when applied onto an electrical cable or over an electrical cable accessory. In an exemplary embodiment, a small ridge or grease dam (not shown) can be formed around the perimeter on the top surface of each interlocking plate to retain the grease between the core and the elastic sleeve, preventing the grease from leaking through the seams between adjacent interlocking plates. In an exemplary embodiment, the grease dam is formed along the helical edge of each interlocking plate to prevent grease migration through the seam between adjacent cylinder sections.

Support core 100, 200 can further include installation aids to help the craftsman in properly installing the elastic sleeve supported by the support core. For example, each cylinder section can include directional indicia 112a and tooling orifices 112b as shown in FIG. 1C. The directional indicia tell the craftsman which direction to apply a rotational force in order to disengage the interlocking features 117 extending from helical edge 113 at the abutment end of each cylinder section 110, 120. Additional indicia (not shown) may be formed in the surface of the first and second cylinder sections to simplify installation of a cable accessory supported on the exemplary support core. For example, additional indicia may include indicia indicating the order of installation steps or the type and/or preferred positioning of tools used to install a cable accessory supported on the exemplary support core onto a cable.

A craftsman can insert a screwdriver or a metal rod through the tooling orifices 112b to provide a force advantage when rotating the first and second cylinder sections with respect to one another as well as supplying a handle for applying a longitudinal force on the cylinder section to complete removal from the elastic sleeve. The initial rotational movement of the first and second cylinder sections begins to move the cylinder sections away from one another as the helical edges of the first cylinder section slides along the helical edge of the second cylinder section over the first 180° of rotation.

In an alternative aspect, the first and second cylinder sections can be different colors to indicate which cylinder section should be removed first.

Figure 5A:
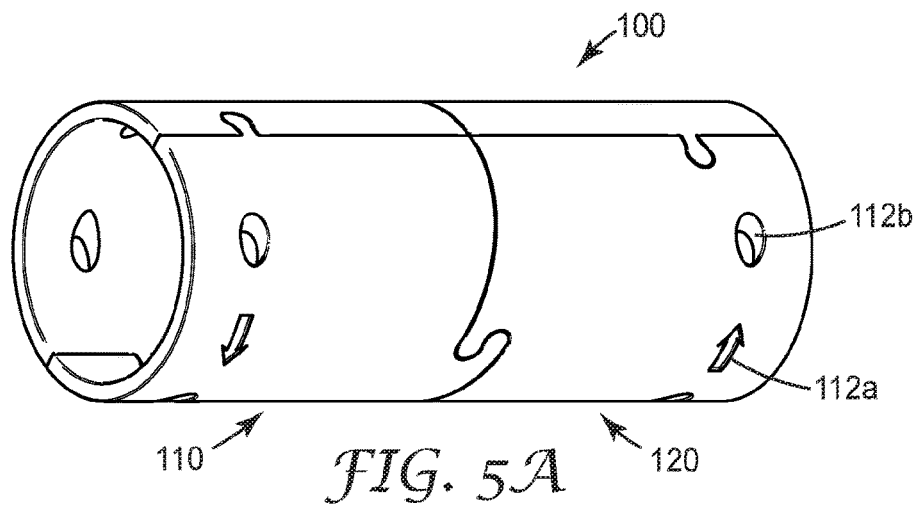
FIGS. 5A-5E show an exemplary support core at different points during installation of an elastic sleeve onto a cable or over and electrical cable accessory according to the present invention.

FIGS. 5A-5E show what happens to support core during installation of an elastic sleeve (not shown) onto a cable or over and electrical cable accessory. FIG. 5A shows support core 100 at the beginning of the installation process before beginning the core removal process. The craftsman inserts a tool, such as a screwdriver or a metal rod (not shown), through a pair of tooling orifices 112b at each end of the support core. The tool is used to rotate the first cylinder section 110 and the second cylinder section in a direction indicated by directional indicia 112a.

Figure 5B:
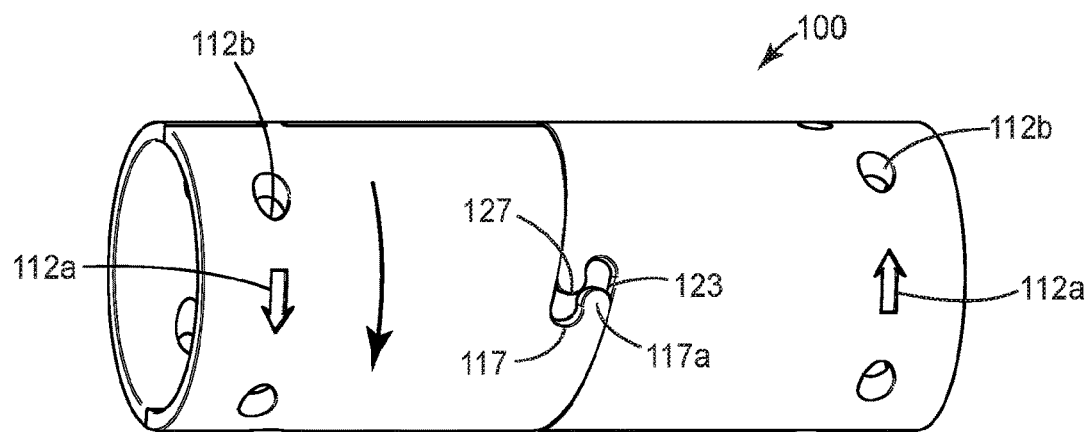

FIG. 5B shows the first and second cylinder sections 110, 120 at the disengagement point of interlocking features 117, 127. As the first and second cylinder sections continue to move in the direction indicated by directional indicia 112a, the tab portion (e.g. tab portion 117a) of the interlocking features of one cylindrical section the will ride along the helical edge (e.g. helical edge 123) of the other selection to help push the first and second cylinder sections apart.

Figure 5C:
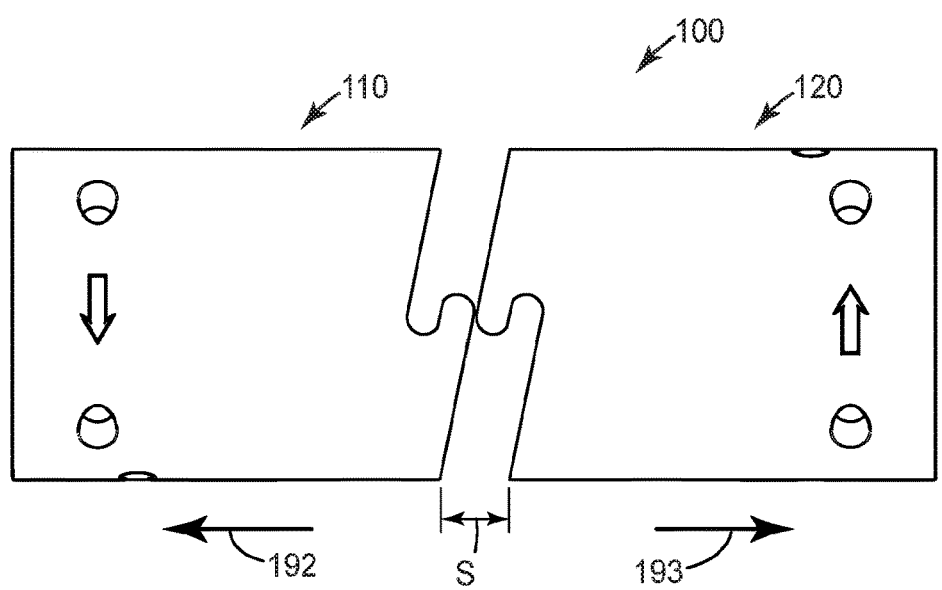

FIG. 5C shows the first and second cylinder sections 110, 120 after about 180° of rotation showing the amount of lateral separation, S, created from the rotation of the first and second cylinder sections. Next, one of the first and second cylinder sections of the support core is removed from the elastic sleeve by applying a longitudinal force represented by arrow 192, 193 to one of the first and second cylinder sections, respectively. The craftsman can verify proper alignment of the elastic sleeve and adjust if necessary. Then the other cylinder section is removed from the elastic sleeve.

Figure 5D:
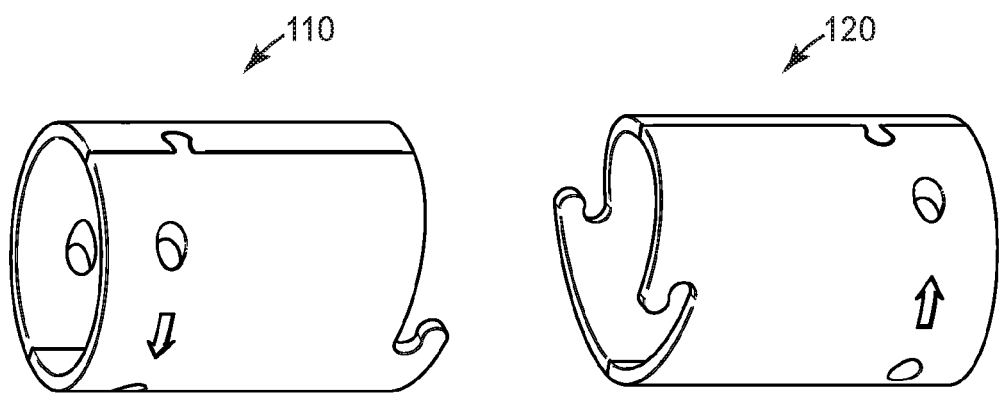

FIG. 5D shows one of the first and second cylinder sections 110, 120 after removal from the elastic sleeve. The one of the first and second cylinder sections would still be encircling the electrical cable (not shown) on which the elastic sleeve was placed. In some conventional solid cores, the craftsman is directed to smash or break the withdrawn core segments which could potentially damage the electrical cable.

Figure 5E:
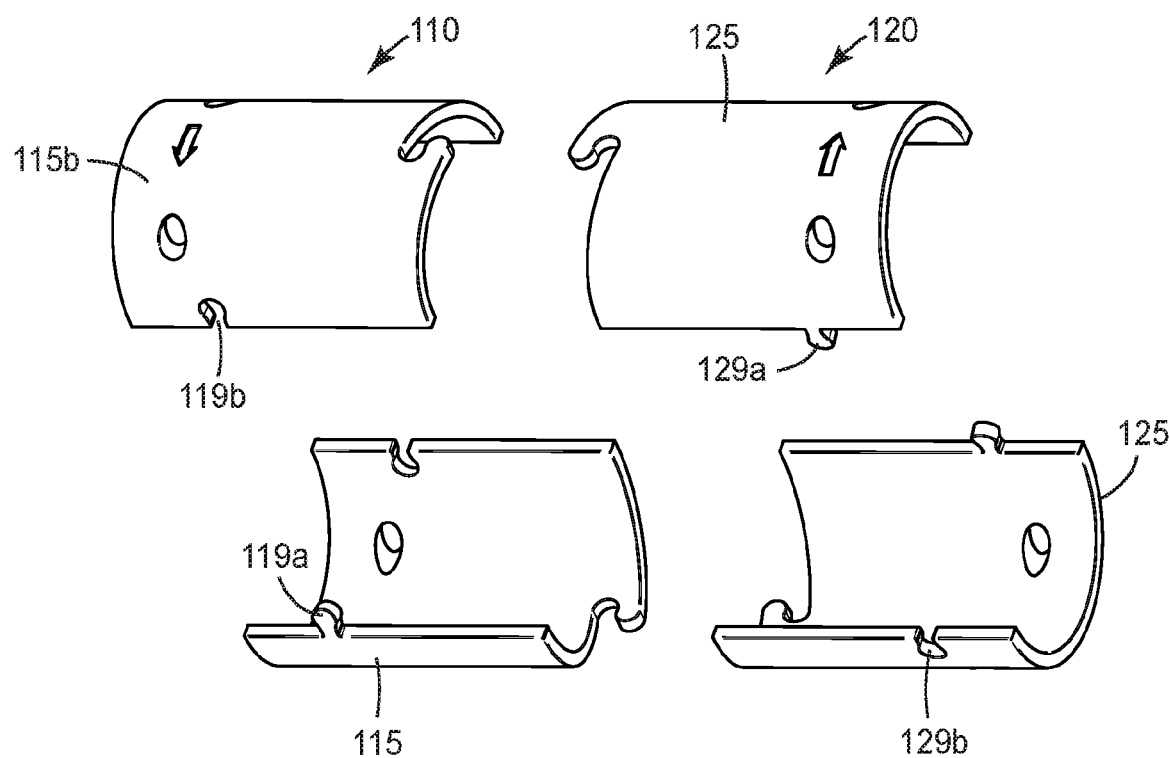

In contrast, the first and second cylinder sections 110, 120 can be separated into separate interlocking plates 115, 125 by removing tongues 119a, 129a from pockets 119b, 129b, respectively, as shown in FIG. 5E.

Figure 3A:
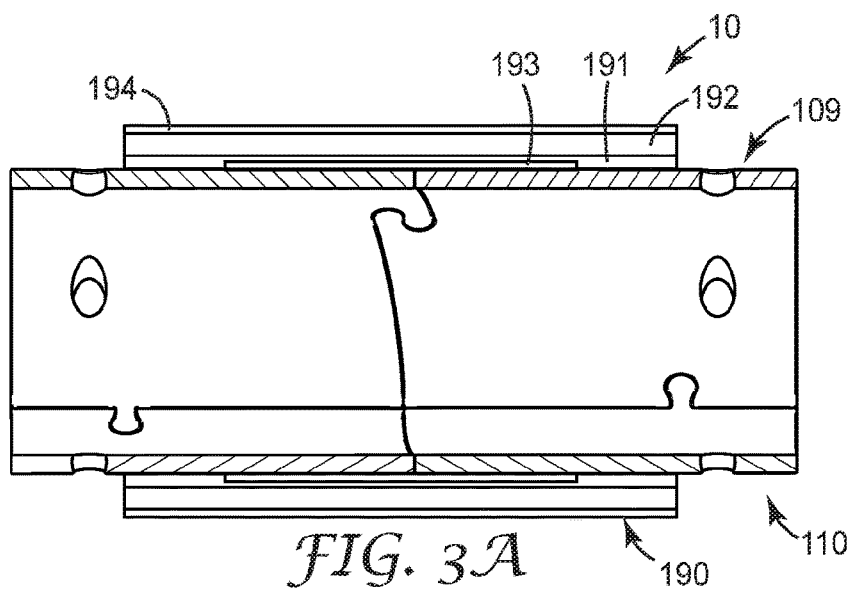
FIGS. 3A and 3B are two views of an exemplary cable accessory utilizing the support core of FIGS. 1A and 1B.
Figure 3B:
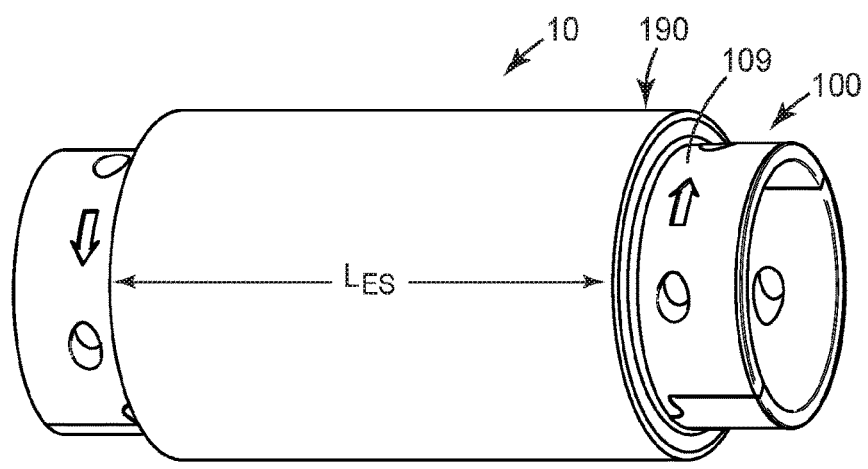

FIGS. 3A and 3B show an exemplary cable accessory 10 comprising an extruded elastic sleeve 190 disposed on the external surface 109 of the support core 100 in an expanded state. Elastic sleeve 190 can have a plurality of layers. In an exemplary aspect, includes at least one continuous layer and one discontinuous layer. The continuous layers can include an electrically insulative polymeric material or high dielectric constant ("high-K") and the discontinuous layer can be a conductive layer, a semi-conductive layer, or a high dielectric constant ("high-K") layer. Exemplary extruded multilayer elastic sleeves are described in U.S. patent application Ser. No. 16/810,137, titled CO-EXTRUDED MULTILAYER ARTICLES INCLUDING CONTINUOUS LAYER AND DISCONTINUOUS LAYER, incorporated herein by reference.

In the exemplary embodiment shown in FIG. 3A, elastic sleeve 190 comprises three continuous layers wherein the first continuous layer 191 is an high dielectric constant layer, the second continuous layer 192 is an insulating layer, the third continuous layer 194 is a semi-conductive and discontinuous layer 193 is a conductive layer.

Figure 6A:
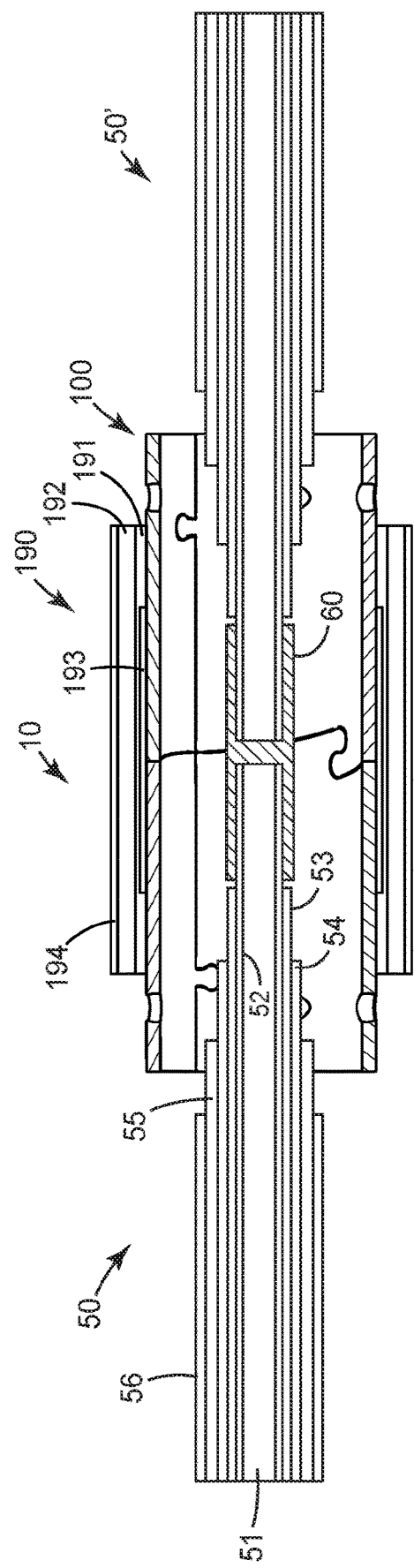
FIGS. 6A and 6B are schematic diagram showing installation of a coextruded multilayer elastic sleeve onto a cable splice according to an aspect of the current invention.
Figure 6B:
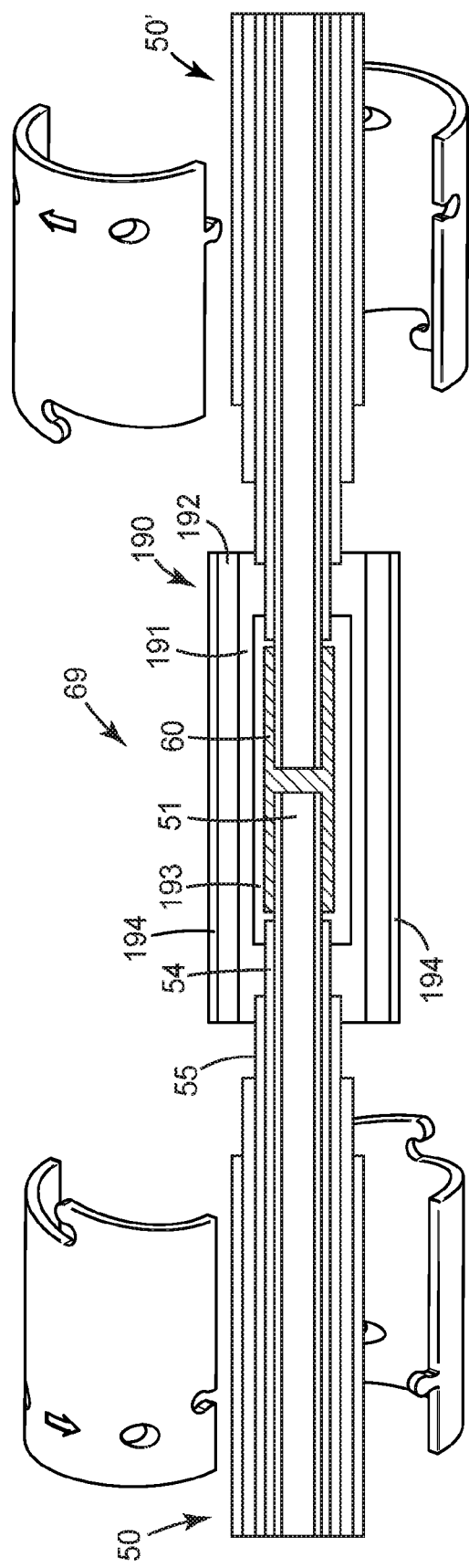

FIGS. 6A and 6B is a conceptual diagram illustrating installation of a multilayer elastic sleeve onto a cable splice connecting a pair of power cables 50, 50'. Insulated power cable 50, 50' may be configured to transmit electricity of any suitable selected voltage and/or frequency underground, underwater, or suspended overhead. For example, insulated power cables 50, 50' may transmit voltages of 11 kV, 33 kV, 66 kV, or 360 kV. In some examples, insulated power cable 50, 50' is configured to transmit "medium voltages" within a voltage range between about 12 kV and about 45 kV. In some examples, insulated power cables 50, 50' transmit electrical power between a power source and substation may transmit voltages of 360 kV or more, which may be considered a "transmission level voltage." In some examples, insulated power cables 50, 50' transmit voltages between 33 kV and 360 kV, which may be considered "subtransmission-level voltages," and may provide electrical power from a power source to an end-user or customer (e.g., customers utilizing a relatively large amount of power). In some examples, insulated power cables 50, 50' that transmit electrical power between a distribution substation and a distribution transformer may transmit voltages less than 33 kV, which may be considered "distribution-level voltages." In some examples, insulated power cables 50, 50' transmit electrical power between a distribution substation or distribution transformer (e.g., a pad-mount transformer or pole-mount transformer) and end-users or consumers (e.g., homes and businesses) and may transmit voltages between 360 volts and 240 volts, at such voltages insulated power cable 50, 50' may be called "secondary distribution lines."

Electrical power cables 50 can include shielded electrical cables having a plurality of concentric (e.g., cylindrical) layers. For example, electrical cables 50 may include a central conductor 51, a conductor screen 52, an insulation layer 53, an insulation screen 54, a shield 55 (e.g., "metallic shield"), and a jacket 56. In some examples, electrical cables 50 may include different layers, fewer layers, or additional layers. Possible additional layers can include a swellable or water blocking material placed within the conductor strands (e.g., a strand fill) or between various layers within electrical cables.

Central conductor 51 can be single solid conductor or a plurality of helically wrapped stranded conductors made from copper or aluminum. A diameter (e.g., cross-sectional area) of the central conductor 51 may be based on the current that electrical cables 50 are designed to transmit.

For example, a diameter of central conductor 51 may be selected to transmit currents of at least about 15 amperes (Å), such as at least about 120 Å, such as at least about 1,000 Å.

Conductor screen 52 is physically and electrically coupled to central conductor 51 between the central conductor and insulation layer 53 and may include a semi-conductive polymer, such as carbon black loaded polymer. The semi-conductive polymer may have a bulk resistivity in a range from about 5 ohm-cm to about 100 ohm-cm. Conductor screen 52 provides a continuous conductive surface around the exterior of central conductor 51, to reduce partial discharge that might otherwise be created by central conductor 51.

Insulation layer 53 can comprise polyethylene, such as a cross-linked polyethylene (which may be abbreviated as PEX, XPE, or XLPE) or an ethylene propylene rubber (EPR).

Insulation screen 54 may include a semi-conductive polymer similar to conductor screen 52. The insulation screen is disposed between insulation layer 53 and shield, such that the insulation screen is physically coupled to the insulation layer and electrically coupled to the shield.

Shield 55 is formed from a conductive material, such as a metal foil, film, or wires and may be referred to as a "earth ground conductor."

Jacket 56 is a rugged outer layer that is configured to support and protect the other layers of electrical cable 50. The jacket can be formed from a plastic or rubber polymer, such as polyvinyl chloride (PVC), polyethylene (PE), or ethylene propylene diene monomer (EPDM).

Central conductor 51 of electrical pore cables 50, 50' are connected by connector 60, typically made of metal such as steel, copper, or aluminum. Connector 60 includes a cylindrical body having an outer surface extending from a first terminal edge to a second terminal edge opposite the first terminal edge. Each end of the cylindrical body may be configured to receive a respective central conductor of the electrical cables. For example, the first terminal edge and the second terminal edge of the connector may each include an aperture configured to receive central conductor of electrical cables. The central conductors can be secured in the connector by crimping or shear bolts.

Elastic sleeve 190 supported by support core 100 is placed over connector such that discontinuous layer 193 is disposed over connector 60 (FIG. 6A), such that after installation the discontinuous layer covers the connector and at least a portion exposed insulation screen 54 as shown in FIG. 6B. The overlapped layers and amount of overlap may be configured to provide selected mechanical and/or electrical properties to splice connection 69. As discussed above, discontinuous layer 193 may include a conductive material or a semi-conductive material that, when in contact with connector 60, central conductor 51, and/or conductor screen 52, may improve transmission of current from first electrical cable 50 to second electrical cable 50' by helping control partial discharge.

The continuous layers (layers 191 and 192) of the elastic sleeve 190 can then extend over at least a portion of shield 55.

FIGS. 7A and 7B are schematic diagrams showing installation of a conventional molded multilayer elastic sleeve 290 onto a cable splice according to an aspect of the current invention. FIG. 7A, shows elastic sleeve 290 disposed on support core 200 prior to installation over connect 60 and FIG. 7B shows elastic sleeve 290 installed over connector 60. Exemplary molded elastic sleeves are described in, for example, U.S. Pat. Nos. 5,801,332 and 7,767,909.

Various examples of multilayer elastic sleeves have been described herein. The exemplary solid support cores can also be used in several other cable accessories such as single layer low voltage elastic sleeves, terminations, etc. These and other examples are within the scope of the following claims.

What is claimed is:

1. A support core configured to maintain an elastic sleeve in a radially expanded state, said support core comprising:
a first cylindrical section disengagably connected to a second cylindrical section,
wherein each cylindrical section of the first and second cylindrical sections comprises an annular sidewall having a plurality of interlocking plates extending longitudinally along a portion of the support core between an abutment end and a distal end, wherein the abutment end has a generally helical edge,
wherein each of the plurality of interlocking plates, comprises a bottom surface, a top surface that is substantially parallel to the bottom surface and two opposing longitudinal edges extending between the bottom surface and the top surface on opposite sides of the interlocking plate wherein each of the two opposing longitudinal edges comprises a joining feature configured to connect to a mating feature of at least one other interlocking plate to form one of the first and second cylindrical section of the support core, and further comprising two interlocking features extending from the helical edge on opposite sides of each of the first and second cylindrical sections to secure the first and second cylindrical sections together in an end to end arrangement until the interlocking features are disengaged, wherein the interlocking features of each of the first and second cylindrical sections comprise a tab portion and a receptacle portion configured to receive the tab portion of the mating cylinder section when the first and second cylindrical sections are assembled to form the support core, wherein the tab portion includes a distal portion having a maximum width that is larger than the minimum width of an opening of the receptacle portion in which the tab portion resides when the first and second cylindrical sections are assembled together into the support core and wherein the maximum width of the tab and the minimum width of the receptacle establish a torque required to initiate a separation of the first and second cylindrical sections.

2. The support core of claim 1, wherein the plurality of interlocking plates in the first cylindrical section are identical.

3. The support core of claim 1, wherein the plurality of interlocking plates in the second cylindrical section are identical.

4. The support core of claim 1, wherein the plurality of interlocking plates in the support core are identical.

5. The support core of claim 1, the first cylinder section and the second cylinder section are the same length.

6. The support core of claim 1, wherein the plurality of interlocking plates each has a concave shape.

7. A cable accessory comprising:
an elastic sleeve; and
the support core of claim 1.

8. The cable accessory of claim 7, wherein the elastic sleeve is a multilayer molded elastic sleeve.

9. The cable accessory of claim 7, further comprising a grease disposed between the elastic sleeve and the support core.

10. The cable accessory of claim 9, wherein the grease is a silicone grease.

11. The cable accessory of claim 7, wherein the abutment end of each interlocking plate has a generally helical edge.

12. The cable accessory of claim 11, wherein the first and second cylinder sections further comprises a tooling orifice for insertion of a tool in order to provide a force advantage when rotating the first second cylinder section with respect to the and second cylinder section.

13. The support core of claim 1, wherein the first and second cylinder sections further comprises a tooling orifice for insertion of a tool in order to provide a force advantage when rotating the first second cylinder section with respect to the and second cylinder section.

14. The support core of claim 1, wherein the joining feature and the mating feature are formed, respectively, as a locking tongue extending from a discrete portion of a longitudinal edge of the first cylindrical section and a pocket formed within a discrete portion of a longitudinal edge of the second cylindrical section and having a corresponding shape to receive the locking tongue in an interference fit, wherein the locking tongue and pocket are formed transverse to an axis of the cylindrical surface of an assembled support core and flush with an outer surface of the assembled support core.

15. The support core of claim 14, wherein the joining feature comprises a generally rounded shape.

16. The support core of claim 13, wherein each of the first and second cylindrical sections includes directional indicia to indicate a direction in which to employ rotational force to separate the first and second cylindrical sections.

* * * * *

UNITED STATES PATENT AND TRADEMARK OFFICE
CERTIFICATE OF CORRECTION

PATENT NO. : 11,705,711 B2
APPLICATION NO. : 17/593003
DATED : July 18, 2023
INVENTOR(S) : Anton Fred Jachim et al.

It is certified that error appears in the above-identified patent and that said Letters Patent is hereby corrected as shown below:

In the Claims

Column 12
Line 12 (approx.), In Claim 12, delete "the and second cylinder section" and insert -- the second cylinder section --, therefor.

Line 17 (approx.), In Claim 13, delete "the and second cylinder section" and insert -- the second cylinder section --, therefor.

Signed and Sealed this
Thirteenth Day of February, 2024

Katherine Kelly Vidal
*Director of the United States Patent and Trademark Office*